Patented Oct. 16, 1934

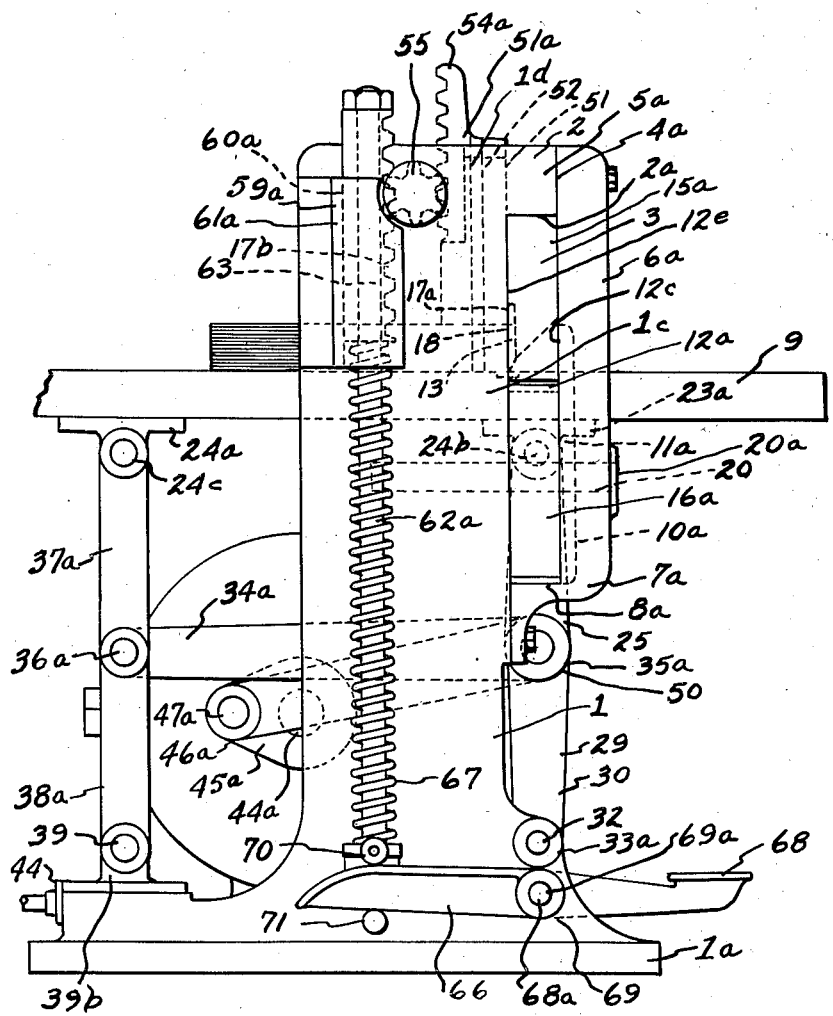

1,976,972

UNITED STATES PATENT OFFICE 1,976,972

CUTTING MACHINE

William L. Valiquette, Dayton, Ohio

Application February 27, 1933, Serial No. 658,750

10 Claims. (Cl. 164—54)

My invention relates broadly to cutting machines, and specifically to the machines used for cutting single sheets or stacks of materials, such as paper.

The usual type of paper cutting machine has a stationary cutting table, and the cutting blade is depressed towards the table with a shearing movement imparted by lateral movement to the blade. In machines which have a downwardly actuated cutting blade, there are two defects. First, if an operator has his hand under the blade, and due to some breakage in the machine, the knife drops, the operator will be injured. Secondly, the operator is ordinarily holding stacks of sheets with his hands, and when the table is stationary there is no moving part of the machine which the operator feels which indicates the start of a cutting operation.

It is an object of my invention to provide a cutting machine in which the cutting blade does not move downwardly, but only laterally, and the table rises, carrying the material to be cut into contact with the knife.

Another object of my invention is the provision of a cutting machine in which a power motivated table operates the cutting blade and the clamping means in sequence, and in which the power is applied to the table knife.

Broadly, the principal object of my invention is the provision of a cutting machine in which the table moves the work into engagement with the knife so that the operator will feel the table start to move, and if his fingers extend over the line of cut, he will almost involuntarily remove them. Further, if the mechanism breaks gravity will not cause the knife to drop.

Another object is to provide a spring-controlled clamp which is operated by the upward movement of a cutting table and which is adapted to produce follow up pressure on the materials during a cutting operation.

Another object of my invention is to provide a cutting table supported and elevated by a toggle which operates the cutter blade and the clamp while the table is being elevated.

More specifically it is the object of my invention to provide a cutting machine which has a cutter blade movable laterally across a stack of material as it is elevated, and which is caused to move laterally by mechanical connections with the table during the interval in which the cutting table is elevated by means of the toggle. The table, in addition to being the motive force, also operates the knife and a spring-controlled clamp which equalizes the follow up pressure necessary on a stack of material while it is being cut.

These and other objects will be more specifically pointed out in the specification describing the drawings illustrating the preferred embodiment of my invention.

In the drawings:

Figure 5 is a left side elevation of my machine showing the table in elevated position at the end of a cutting operation.

Figure 1:
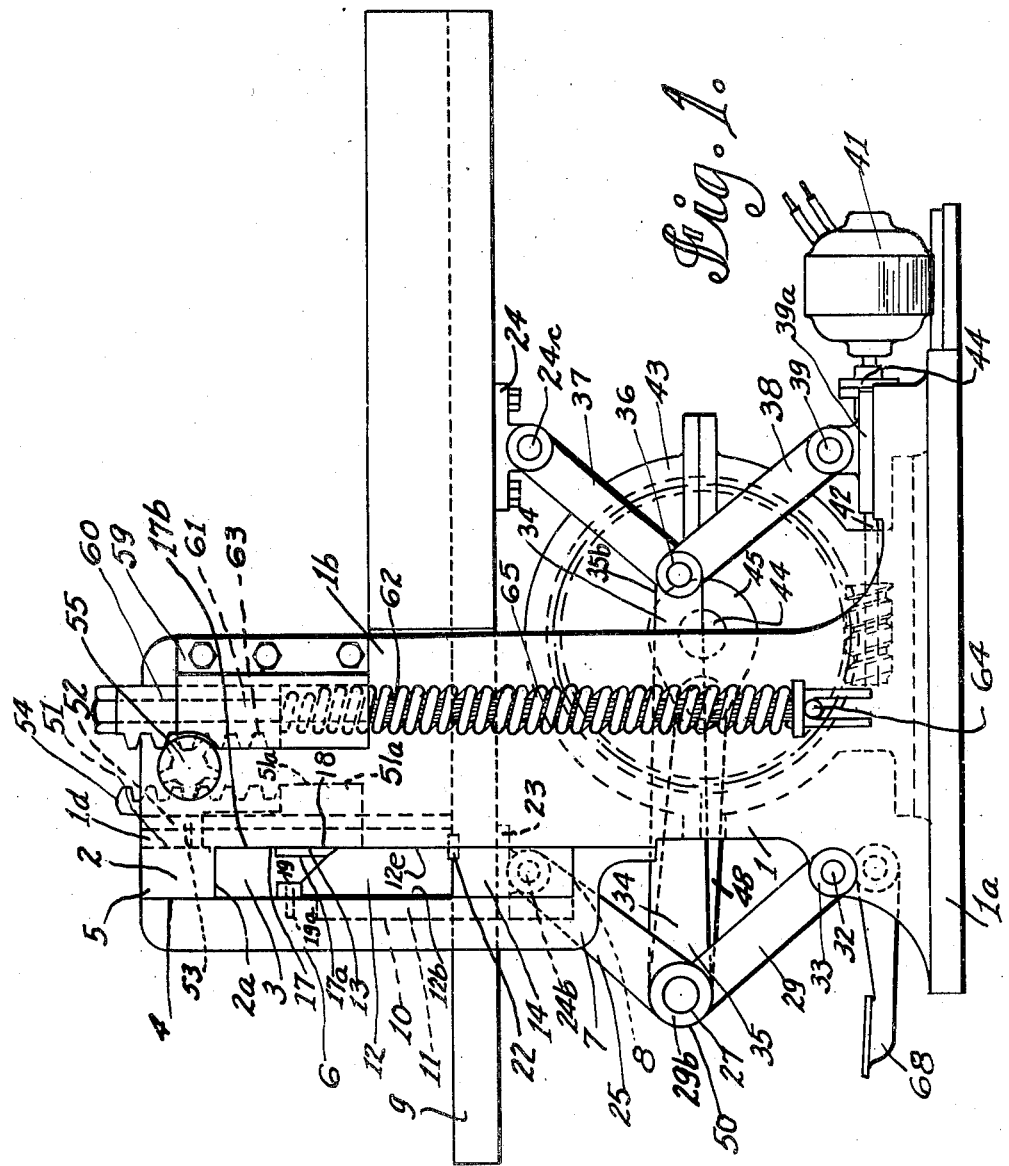
Figure 1 is a right side elevation of my machine.
Figure 2:
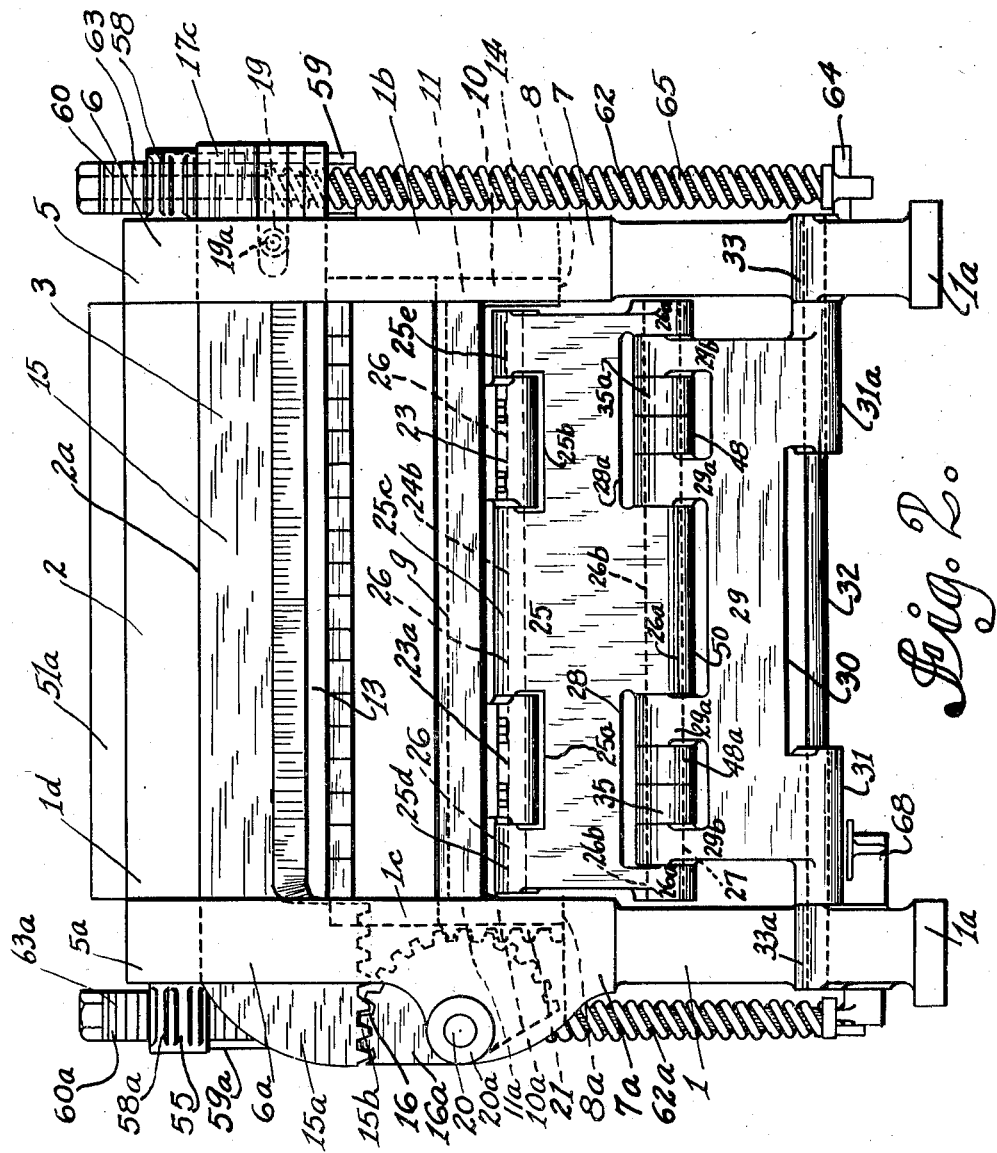
Figure 2 is a front elevation of my machine.
Figure 3:
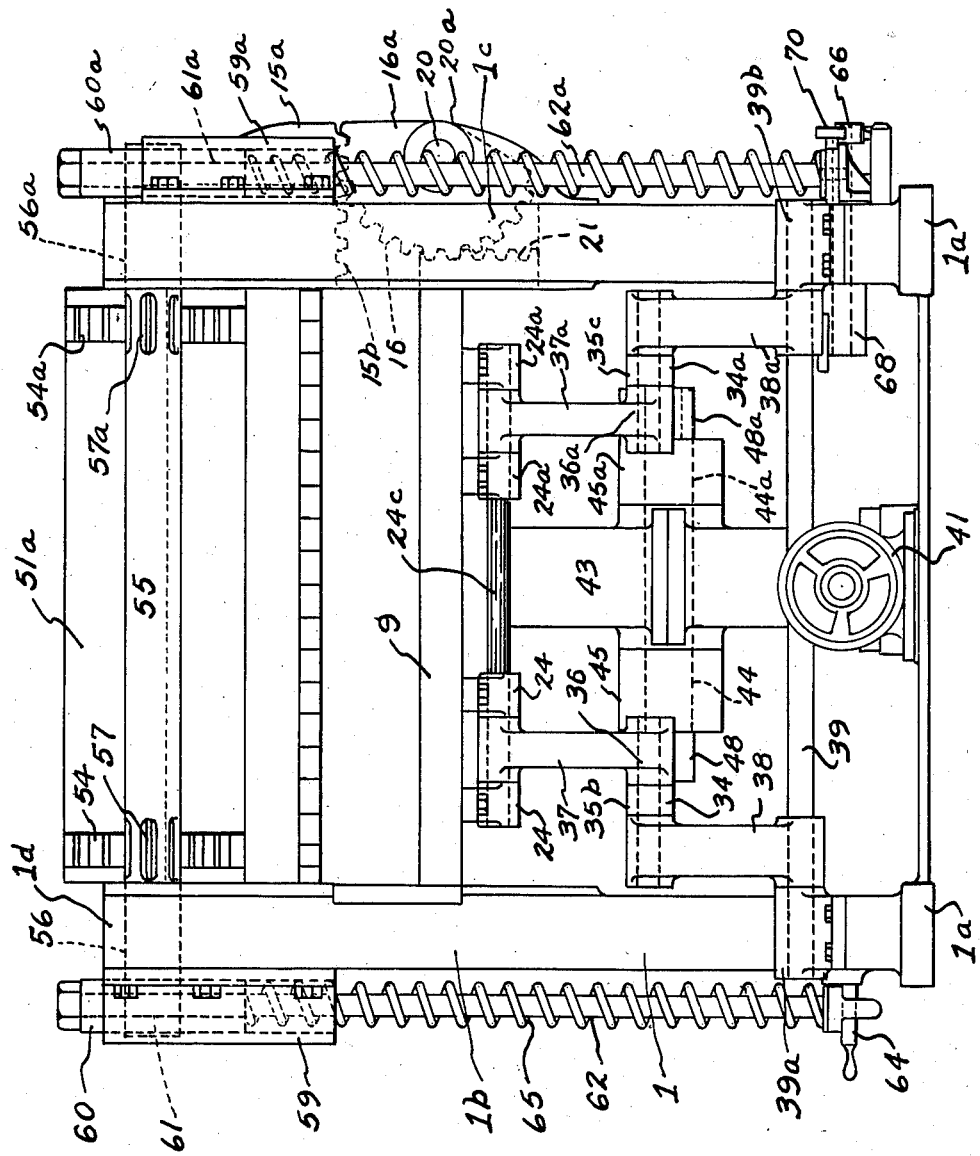
Figure 3 is a rear elevation of my machine.
Figure 4:
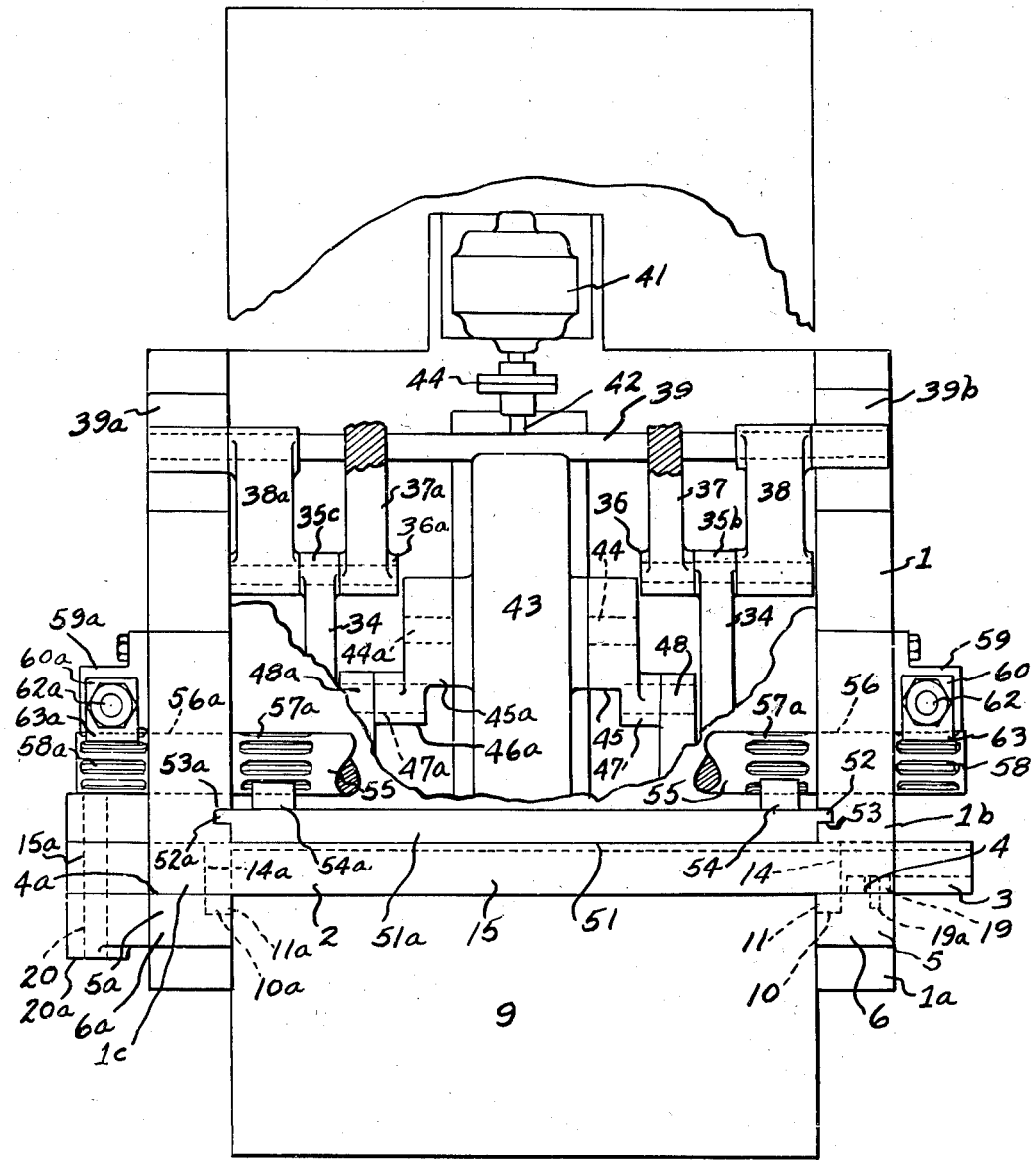
Figure 4 is a top plan of my machine, with part of the cutting table broken away.

The main frame 1 of my machine has a base 1a and two upright standard portions 1b and 1c. At the extreme upper end 1b of the standards there is a projection 2. An underside 2a is machined to provide a sliding surface for a knife bar 3. Outer faces 4 and 4a have bolted to them at the upper ends 5 and 5a the elongated guideway caps 6 and 6a. The lower ends 7 and 7a of the caps are bolted to the standards and provide stop portions 8 and 8a to limit the downward movement of a cutting table 9. Each of the guideway caps have slots 10 and 10a for key projections 11 and 11a integral with the table.

The spaces 12 and 12a between the inner surfaces 12b and 12c of the caps and the surfaces 12d and 12e of the standards provide a guideway in which a knife 13 on the knife bar and the projections 14 and 14a of the table are free to slide. The knife and its holder are limited to lateral movement while the projections of the table are free to slide vertically in a line at right angles to the line of movement of the knife. The table is limited to vertical movement.

The knife bar has an elongated body portion 15 which is enlarged at one end 15a. On this end along a bottom edge there are gear teeth 15b which engage with gear teeth 16 on a gear sector 16a. In the rear surface 17 of the knife bar there is a slot 17a into which the knife is inserted and then bolted to the bar. The knife is so positioned that its inner surface 18 and the surface 17b of the bar are in line for sliding smoothly over the upper part of the surfaces 12d and 12e of the standards. In the end 17c of the bar there is a slot in which a roller 19 is free to rotate. The roller is rotatably mounted on a stud 19a which is fixedly mounted in the guideway cap. The roller supports the knife and its bar while it is at rest or sliding in its guideways.

The gear sector 16a is rotatably mounted on a shaft 20 which is fixedly mounted in bearings 20a which are provided on the main frame and the guideway caps. This gear sector is rotated by means of a rack 21 which is fixed on the table, and it in turn moves the knife and its bar to and fro laterally with relation to the table.

The table is guided in the guideways while it is being moved vertically by means of the keys and the projections that extend between the guideways. In the upper surface a cutting stick